United States Patent [19]

Hinkes

[11] 3,911,183

[45] Oct. 7, 1975

[54] SEED COATING PROCESS AND PRODUCT

[76] Inventor: Thomas M. Hinkes, 5414 Dorsett Drive, Madison, Wis. 53711

[22] Filed: Nov. 10, 1972

[21] Appl. No.: 305,485

[52] U.S. Cl. ............... 428/15; 47/57.6; 47/DIG. 9; 71/3; 71/77; 427/213; 427/214; 427/385; 427/407; 427/417; 427/424; 428/403
[51] Int. Cl.$^2$ ............................................ A01C 1/06
[58] Field of Search ............... 117/3, 100 A, 72, 73; 47/DIG. 9, 57.6; 71/77, 3; 428/15, 403; 427/213, 214, 385, 407, 417, 424

[56] References Cited
UNITED STATES PATENTS

| | | | |
|---|---|---|---|
| 3,545,129 | 12/1970 | Schreiber et al. | 117/3 X |
| 3,592,910 | 7/1971 | Clark et al. | 117/3 X |
| 3,598,565 | 8/1971 | Graves | 47/57.6 X |
| 3,698,133 | 10/1972 | Schreiber | 47/57.6 |
| 3,703,404 | 11/1972 | Kirk | 117/72 |

*Primary Examiner*—Harry J. Gwinnell

[57] ABSTRACT

Seed, especially delinted cotton seed, is coated with a polymeric-pesticide film wherein the pesticide release is programed to protect the plant during germination and plant growth. A precoat is preferably used on surfaces having linters thereon. Halogenated vinyl resin emulsions have been effectively employed as the film former and pesticide carrier.

12 Claims, 2 Drawing Figures

SEED COATING PROCESS AND PRODUCT

BACKGROUND OF THE INVENTION

1. Field of the Invention

This invention relates to seed coating compositions, a method of coating seeds and the coated seed product. More particularly, a polymeric pesticide slow release composition is applied to either previously coated or uncoated seeds to provide a controlled source of the pesticide that protects the plant during germination, growth and the like.

2. Description of the Prior Art

Present-day techniques for applying pesticides to seed prior to planting are gaining favor because of its time-saving advantages. Thus, when the farmer plants seed only one step is involved. This contrasts with the previous practice of first planting the seed and then providing the necessary pesticide protection separately. However, it was found that applying pesticide directly to seed can be troublesome, especially where the seed has a limited tolerance for applied chemicals, which, under certain conditions, adversely affects the seed. Furthermore, the pesticide protection lasts no longer than the soil and weather conditions permit, for the pesticides are subjected to moisture and the like in the soil immediately upon planting. It has been the goal of researchers to retain the logistic benefits of supplying a fully treated seed while avoiding the limitations of the art as it has thus far been practiced.

GENERAL DESCRIPTION OF THE INVENTION

Broadly stated, the present invention incorporates the desirable aspects of protecting seed with pesticide but without the concomittant adverse effects of prior techniques. In the present invention, pesticides are uniformly dispersed or dissolved in a polymeric solution or emulsion, and applied to the seed whereby a polymeric-pesticide film is formed which protects the seed from the toxic characteristics of the incorporated chemicals. The polymeric film effects a scheduled release of the dispersed or dissolved chemicals from the film to protect the plant during germination and early growth. Additionally, the seed treatment according to the present invention provides additional protection to those persons handling the seed from the toxic agents included in the seed coating.

Another important aspect of this invention resides in pretreating the seed surface prior to applying the polymeric-pesticide coating according to this invention. For instance, where the seed surface is covered with linters or short fibers, e.g., cotton seed, which alter the surface area of the polymeric-pesticide film, pretreatment is recommended. It was found that the surface of cotton seed, even after flame delinting, was covered with short fibers. Thus, the surface of linter covered seed is desirably first precoated with a natural or synthetic substance which will cover the fibers and adhere the fibers to each other as well as to the seed. The aforementioned pretreatment can be deleted where the surface of the seed is already receptive to the polymeric-pesticide coating of the present invention, and therefore requires no further conditioning.

Numerous polymeric-pesticide formulations were evaluated to determine the solubility and release characteristics of the pesticide carried by the polymer. A primary requirement is that the release rate of the active ingredient conform to the growth rate of the plant and at the same time the pesticide must not be phytotoxic to the seed and emerging plant. As a result of the evaluation, it was determined that the rate of pesticide release was a function of pesticide solubility in the resin employed, which also varied inversely with film thickness and directly with pesticide concentration and type.

Of the various resin-pesticide systems tested, the vinyl halide based polymers which included homopolymers, copolymers, terpolymers and the like yielded highly effective delayed release films for pesticides and the like. The vinyl resins found particularly useful were the halogenated derivatives such as polyvinyl chloride, polyvinylidene chloride, and their copolymers, terpolymers, etc. Polymeric resin formulations comprising polyvinyl chloride and polyvinylidene chloride are commercially available copolymerized with monomers such as other unsaturated halogenated hydrocarbons, styrene and its halogenated derivatives, vinyl esters, olefins, dienes, derivatives of acrylic acid and the like. For ease of application and for safety reasons, the preferred formulations include aqueous vinyl latexes, such as vinyl chloride-vinylidene copolymers, vinyl chloride-butadiene-styrene terpolymers, vinyl chloride-butadiene-acrylonitrile terpolymers, polyvinyl acrylates, or mixtures thereof. The aqueous latex dispersions sold under the GEON trademark by B. F. Goodrich Chemical Co., Cleveland, Ohio are exemplary of vinyl latexes which have been used with success. For example, the Geon 350 and Geon 460 series of vinyl latexes have been particularly effective with cotton seed.

Of the pesticides evaluated, systemic pesticides, especially the organophosphorus insecticides have been found to be very effective. For example, DI-SYSTON, trademarked product of Chemgro Corporation, having the formula O,O-diethyl S-[2-(ethylthio)ethyl]phosphorodithioate is exemplary of an insecticide which has been used with good results. DEMOSAN (a trademarked fungicide product of E. I. duPont de Nemours, Inc., Wilmington, Delaware) with the formula 1,4-dichloro 2,5-dimethoxybenzene is another example of a pesticide suitable for use with the composition of the present invention. Another pesticide which can be employed in the polymeric pesticide coating according to the present invention is the insecticidefungicide CAPTAN, sold by Chevron Chemical Co., Ohio Division, San Francisco, California. Captan is N-[(trichloromethyl)thio]-4-cyclohexene-1,2-dicarboximide, which is sold in admixture with methoxychlor as 2,2-bis(p-methoxyphenyl)-1,1,1-trichloroethane. It will be appreciated that numerous other pesticides are readily available and can be substituted for or combined with the aforementioned pesticides. The type of pesticide employed will depend on such factors as the seed being coated, the nature of the resin and the environment of use.

Coating formulations can optionally contain minor quantities of conventional surface active and emulsifying agent ranging up to about 5 percent by weight of the formulation. These formulations can include conventional surface active agents such as wetting agents, emulsifying agents, e.g., alkyl phenoxy polyethoxy ethanes (Rohm and Haas Co., Philadelphia, Pa.), viscosity control agents, e.g., hydroxy methyl cellulose (Dow Chemical Co., Midland, Michigan).

Generally, the polymeric-pesticide coating of the present invention comprises from about 3 percent to about 20 percent by weight of the seed, with the resin portion being the major component thereof (greater than 75 percent by wt.) and preferably on the order of about 90 percent or more. The concentration of pesticide in the coating can vary from about 2 percent to about 12 percent by weight, with from about 4–8 percent being preferred. The amount of pesticide employed in relation to the seed is maintained at the U.S.-D.A. approved level for the specific pesticide and seed. For Di-Syston on cotton seed, this is 0.5 percent by weight of the seed.

According to the present invention, the seeds are substantially uniformly coated with the aforementioned polymeric-pesticide compositions using conventional methods, mixing, spraying or the like. As earlier mentioned, with flame delinted cotton, it is desirable to first precoat the seed to properly prepare the surface prior to applying the final coat. The weight of the first coat being about 0.5 to 5.0 percent of the weight of the coated seed product. The coating compositions found useful for this initial coating can be selected from a wide range of natural or synthetic resins or emulsions such as gums, starches, cellulose derivatives and colloidal proteins. Water-soluble compositions are preferred. To apply the first coat the seed is wet completely with the coating composition in a mixer or tumbler and then dried. The dried coating holds the fibers tightly to the seed as well as to the adjacent fibers. In this manner, the seed is rendered capable of being finally coated with high-speed automatic equipment, as will be described in more detail hereinafter. Typical of the preferred compositions for precoating may be mentioned - methyl cellulose, hydrolyzed starch, colloidal protein and vegetable gums. Other resins, film-forming ingredients and suspension can also be used. Optionally, the first coat can also include pesticides in minor amounts as in the case of the final coating.

The preferred method for coating seed utilizes the Wurster air suspension apparatus as further described in U. S. Pat. No. 2,648,609, issued Aug. 11, 1953 to Dale E. Wurster, U. S. Pat. No. 2,799,241, issued July 16, 1957 to Dale E. Wurster, U.S. Pat. No. 3,253,944, issued May 31, 1966 to Dale E. Wurster. The seed treated according to this invention is gently suspended in an upward-moving controlled temperature air stream. The particles are directed (not scattered) in a cyclic path through the coating zone as many times as required to receive the desired increments of coating. Thus, each seed is exposed to the coating zone the same number of times statistically and is thereby uniformly coated. The warm air stream supporting the modified fluidized bed also serves to dry the product while it is being coated or otherwise treated. The coating composition is atomized through a spraying nozzle and is deposited on the seed to be coated in thin layers which are quickly dried under the influence of the heated drying air. The rapid drying action provides a cooling effect which prevents overheating of the seed. In this manner, the desired quantity of coating is laid down on the seed.

The resulting product can be used directly or bagged and stored for future use. The seed treated according to the present invention is much easier to plant since the surface is relatively hard and slick and will not readily stick in planting equipment. Moreover, from a safety point of view, the toxicity effects of the pesticide on personnel have been minimized. In addition to cotton seeds, other seeds requiring slow release pesticides can also be treated according to the present invention.

DESCRIPTION OF DRAWING AND PREFERRED APPARATUS

Figure 1:
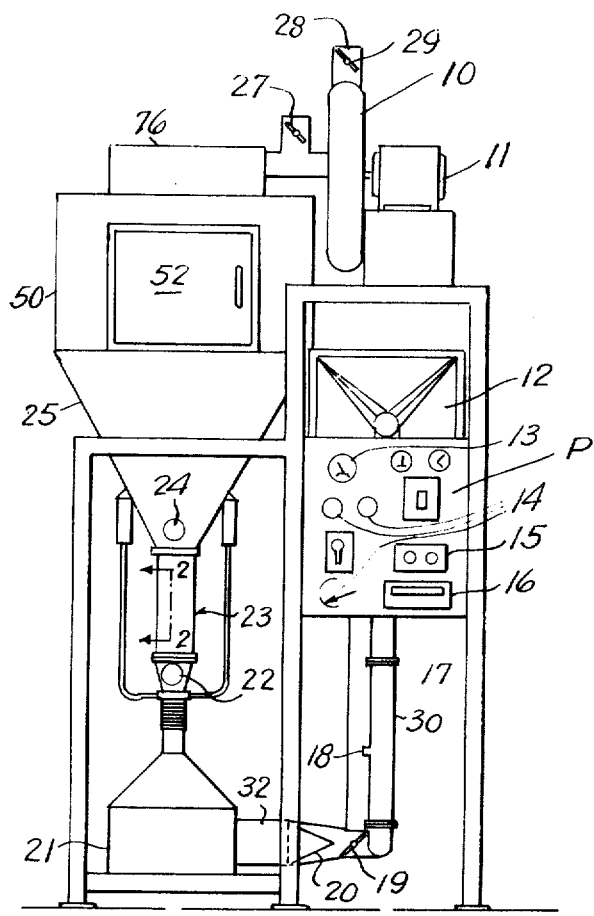
FIG. 1 is an elevational view of a preferred apparatus for carrying out the seed coating process according to the present invention.

Referring first to FIG. 1 which illustrates a preferred coating system for carrying out the process according to this invention. The major portion of the apparatus provided serves to condition the fluidizing gas, e.g., air, which is required for coating. As shown in FIG. 1, atmospheric air is passed through an inlet air filter 12, a heater 20, into an air distribution chamber 21 where it is directed to a coating chamber 23. The air leaves chamber 23 and enters an expansion chamber 25 where it is picked up by a blower 10 and discharged into the atmosphere.

The blower 10 is driven by a motor 11 which is controlled by a starter 15 located on the control panel designated as P. The air flow through the system is controlled by manipulating, singly or in combination; a damper 19 in the air inlet duct 30 connecting the air filter 12 with the heater 20; a damper 29 in the blower outlet duct 28; and a by-pass valve 27 — having one port open to the atmosphere — located between the expansion chamber 25 and the blower 10. Means for adjusting the positions of dampers 19 and valve 27 are provided on the instrument panel P and designated as controls 14. Damper controls are conventional, e.g., pneumatically or electrically operated, and will therefore not be described with any further particularity. The air flow is monitored by means of a pitot tube 18, annubar, or other suitable device positioned within the inlet air duct 17 in a manner well known and connected to an air flow indicator gauge 13 mounted on the instrument panel P. Thus, by observing the gauge 13, the desired flow is readily achieved by actuating one or more of the controls 14.

The heater 20 can be a steam heat exchanger although an electrical heating element may be used. However, a steam heating section is preferred from a safety standpoint. The heater 20 passes through duct 32 and into the coating chamber 23 provided with thermometers 22, 24 at its inlet and outlet, respectively. In lieu of the thermometers 22, 24 which are used to determine the temperature of the air conveyed to the coating section of the apparatus, heat sensing elements connected to a temperature recorder on the panel P may be substituted especially where a continuous record of the air temperature is needed. It is also advisable to include a wet bulb thermometer (not shown) to determine the inlet air humidity.

Figure 2:
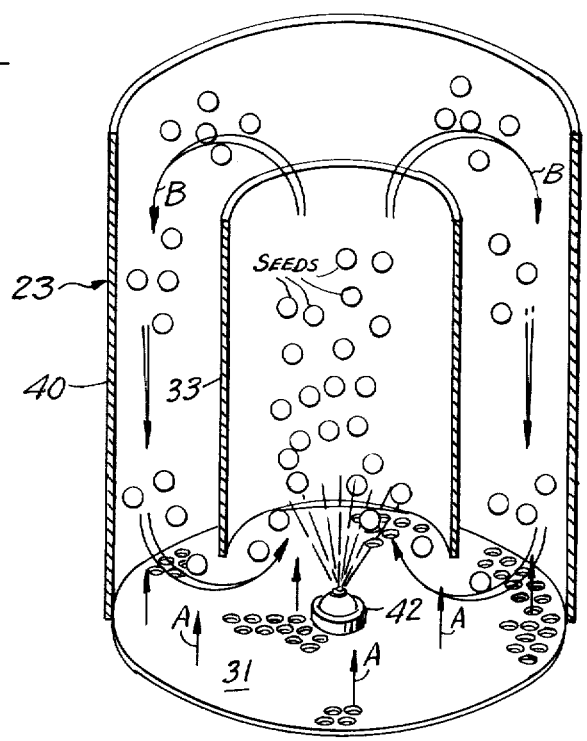
FIG. 2 is a diagrammatic sectional view, in elevation, illustrating the internal construction of the coating chamber shown in FIG. 1 and substantially taken along line 2—2.

Referring now to FIG. 2, which is an enlarged view of the internal construction of the coating chamber 23, it is seen that the chamber 23 comprises an outer housing 40, preferably of cylindrical shape, conditioned air enters the bottom portion of chamber 23 through a perforated air distribution plate 31 passing upwardly as shown by the arrows A. Hydraulic or pneumatic coating nozzle 42 is suitably disposed in the center of the air distribution plate 31. The coating nozzle 42 is connected via tubing (not shown) and a control valve (not shown) to a coating fluid reservoir (not shown). The tubing which is used to convey the coating fluids from the reservoir to the atomizing nozzle can be formed of nylon or any other inert material. The simplest and most economical liquid flow control can be obtained by pressurizing the liquid reservoir to about 10 p.s.i. using a needle-type throttling valve to control the flow of the atomizing nozzle. The use of a metering pump as an optional feature can provide more consistent and reproducible results.

By means of the disposition and size of the perforations in plate 31 the air flow is contained, controlled and directed and hence the movement of the materials coated within the chamber is also controlled. As each particle passes through the coating zone it is carried upward on a stream of heated air (as represented by the arrows B) within the confines of the substantially annular partition 33, then descends outside the partition 33 where it begins another coating cycle. The controlled cycling in continued until all particles are adequately coated.

Above the coating chamber is an expansion chamber 25 (FIG. 1) of greater diameter than the coating chamber in which the linear velocity of the air is decreased, allowing the particles to settle out of the air stream. A collection section 50 with access means 52 is connected to the expansion chamber 25. The expansion chamber outlet may be fitted with a suitable filter 26 or other means for removing particulates from the air stream.

Having described the present invention in general terms, a more complete description of preferred embodiments is presented by way of Examples. These Examples are not meant to be limiting, but are merely illustrative.

EXAMPLE 1

In this example, flame delinted cotton seed was processed as follows:

A. Pretreatment 25 pounds of delinted seed were added to a conventional mixing tank with cooked corn starch solution prepared from a 4.5 percent cooked solution, e.g., 90 grams (0.2 pounds) corn starch in a total volume of 2.0 liters (0.53 gallons) water. The coated seed was then dried. The surface of the seed was hard and smooth.

B. Final Coating

A polymeric-pesticide coating composition according to the present invention was prepared in the following proportions:

| Ingredient | Weight (grams) |
| --- | --- |
| Polymeric resin: Geon 354 emulsion (50% solids) | 890.0 |
| Insecticide: Di-Syston emulsion (Note 1) | 382.7 |
| Fungicide: Demosan aqueous suspension (Note 2) | 634.6 |

The above-listed ingredients when mixed together had a solids content of 38.3 percent with the resin and pesticides contributing 60 percent and 17.5 percent of the total, respectively.

25.2 pounds seed pretreated in the manner described under paragraph A is further processed using the system similar to that shown in FIG. 1. The polymeric-pesticide coating composition as prepared above is applied with a pump to the cycling seeds at a rate of 125–150 grams per minute. Approximately 800 cfm of processing air, heated to 105°–110° F. is maintained. The total time required to apply the coating is about 12 to 16 minutes. An air atomizing nozzle is used to apply 1907.3 grams (g) of the coating composition at 75 psi air pressure. At the conclusion of the coating cycle the coated seeds are allowed to dry for 2—4 minutes until the outlet air temperature reaches 95°–100° F. The seeds are then cooled to ambient temperatures using non-heated processing air. After cooling the coated seeds are removed from the Wurster unit and are ready for packaging. The finally coated seed product incurred about a 7 percent weight increase over the starting material, all but about 1–7 percent being supplied by the polymeric-pesticide final coat. The coating thickness was about 0.5 to 2 mils.

Note 1: Prepared by mixing 57 g Di-Syston (98% active) with 134 g Santicizer 148 (trademarked product of Monsanto Chemical Co.) plasticizer and 7.7 g Triton X-45, then mixing with 184 g Triton X-100 solution of 11.4 g Triton X-100 in 172.6 g water. Triton X-45 and X-100 are trademarked wetting and emulsifier products of Rohm & Haas Co.

Note 2: Prepared by dispersing 71 g Demosan with 490 g water then mixing with 73.6 g Methocel 60 HG 50 cps thickener sold by Dow Chemical Co. (3.6 g Methocel, 70 g water).

EXAMPLE 2

In this example, the procedures as outlined in Example 1 were duplicated, except that the final coating composition comprising Geon 460 ×1 was substituted for the composition comprising Geon 354. The Geon 460 ×1 does not require a plasticizer for room temperature film-forming properties.

The coating composition was formulated as follows:

| Ingredient | Weight (grams) |
| --- | --- |
| Polymeric resin: Geon 460 × 1 emulsion (50% solids) | 2420 |
| Insecticide: Di-Syston emulsion (Note 1) | 106 |
| Fungicide: Demosan aqueous suspension (Note 2) | 1119 |
| | 3645 |

The results obtained were substantially identical to those shown in Example 1.

Note 1: Prepared by mixing 57 grams Di-Syston (98% active) and 2 grams Triton X-45, then mixing with 47 grams Triton X-100 solution of 3 grams Triton X-100 in 44 grams of water.

| Note 2: | Prepared by dispersing 71 grams Demosan with 915 grams water then adding 133 grams of Methocel 60 H6 cps thickener (6.6 grams Methocel, 126.4 grams water). |
|---|---|

EXAMPLE 3

In this example, the procedures as outlined in Example 1 were duplicated, except that the final coating composition comprising Geon 351 was substituted for the composition comprising Geon 354.

The results obtained were substantially the same as those shown in Example 1.

EFFECTIVENESS

In order to demonstrate the effectiveness of the present invention, the thus-coated cotton seeds were tested under greenhouse conditions for phytotoxicity on germination, insect control of the cotton aphid, plant yield, and compared against a control (uncoated seeds containing fresh treatments of the same insecticides and fungicides). The results are tabulated hereinbelow under Tables I and II, as follows:

TABLE I

The pesticide Performance from Cotton Seeds Treated with Di-Syston Distributed in Polymeric Resin Films[1]

| Treatment Resin Coated Seeds | Age of Plants[2] | | | | |
|---|---|---|---|---|---|
| | 2 wks | 3 wks | 4 wks | 5 wks | 5 wks, 3 days |
| Geon 354 (See Example 1) | 100 | 100 | 100 | 87 | 77 |
| Geon 460 × 1 (See Example 2) | 100 | 100 | 100 | 95 | 77 |
| Geon 351 (See Example 3) | 100 | 100 | 100 | 100 | 77 |
| Control[3] | 100 | 100 | 100 | 37 | 0 |

[1]Rating (0 is no kill (or loss) of live cotton aphids; 100% is complete kill (or loss) of aphids.
[2]Indicates age of plant after emerged and at full, open, cotyledon stage (1 week after planting)
[3]Contains no resin but treated with Di-Syston.

Table I demonstrates the performance under greenhouse conditions of the pesticide when applied to the seed in a polymeric pesticide film is longer lasting than the conventional pesticide application because it releases the pesticide at a controlled rate conforming to the growth of the plant.

TABLE II

Phytotoxicity on Seed Germination and Plant Yield from Cotton Seeds Treated with Di-Syston Distributed in Polymeric Resin Films

| Resin Coated Seed | Germination[1] | Plant Yield[2] |
|---|---|---|
| Geon 354 (See Example 1) | 89% | 127% |
| Geon 460 × 1 (See Example 2) | 85 | 90 |
| Geon 351 (See Example 3) | 92 | unavailable |
| Control[3] | 85 | 100 |

[1]Seed germination percents obtained from standard paper towel germinating test.
[2]Yield data was obtained on plants grown in the Mississippi Delta area. The yield is presented as the percent of control where 100% is equal to the control. [3]Contains no resin but treated with Di-Syston.

Table II demonstrates that the phytotoxicity on seed germination and plant yield from cotton seeds treated with Di-Syston distributed in polymeric resin films is similar to the control in efficacy.

GEON LATEX RESINS release vinyl halide polymers and copolymers sold under the Geon trademark by B. F. Goodrich Chemical Company, Cleveland, Ohio, were shown to have similar pesticide release characteristics since these resins are representative of a series which differ in vinyl halide and copolymer ratios from the specified resins; likepolymers from other manufacturers containing the vinyl halide with corresponding copolymers can also be substituted for the specified resins.

The Geon latexes are uniform colloidal dispersions of vinyl chloride polymers and copolymers in water. They are commercially available and are further identified as follows:

1. Resin latexes — dispersions of unplasticized polyvinyl chloride and vinyl chloride copolymers. This class of latexes normally requires addition of plasticizers or blending with softer film-forming latexes before use. Examples of this class are Geon 151, Geon 351, Geon 352 and Geon 354 latexes.

2. Preplasticized or "plastic" latexes — dispersions of vinyl chloride copolymers to which plasticizers such as phthalate and phosphate esters are added during manufacture. They form films at room temperature, but attain their best properties upon heating. Examples are Geon 576 and Geon 580 × 12.

3. Polyblend latexes — dispersions of vinyl chloride copolymers combined with butadiene-acrylonitrile copolymers during manufacture. This type is a variation of the preplasticized type. The nitrile polymer acts as a non-migratory, non-extractable plasticizer or softener and contributes oil and grease resistance. Polyblend types are similar to "plastic" latexes in that they, too, form films at room temperature, but attain best properties with heat. Geon 552 is a typical polyblend latex.

4. Vinyl chloride-acrylic copolymers — dispersions of vinyl chloride copolymerized with acrylate esters. All of the latexes in this series have the ability to form clear, continuous films at room temperature without the need for further compounding. Some latexes in this class are Geon 450 × 3 and Geon 450 × 20.

5. Vinylidene chloride latexes. These latexes are also room-temperature film-formers without further compounding. This class, in general, is noted as a barrier to moisture vapor and gases. Geon 652 latex is an example.

6. Vinyl chloride copolymers — containing a heat-activated curing mechanism feature low temperature curing without catalyst and contain no plasticizer. Examples of these are Geon 460 × 1 and Geon 460 × 2.

7. Vinyl chloride — vinyl acetate copolymers. These are latexes that require compounding with plasticizers for film-forming properties. Geon 470 is representative of this class of copolymers.

What is claimed is:

1. A coated seed of a plant having an essentially established growth rate and comprising a polymeric/systemic-pesticide film encapsulating the seed, the film comprising a polymer matrix throughout which the pesticide is substantially uniformly distributed in an effective amount no higher than that permitted by U.S.D.A. regulations, the polymer being a halogenated vinyl resin capable of permitting releases of said pesticide at a predetermined rate conforming to the growth rate of the plant and the seed being cotton seed.

2. A coated seed of claim 1 wherein said polymer is vinyl chloride resin selected from the group consisting of homopolymer, copolymer, and terpolymer and the systemic pesticide is organophosphorus compound, said pesticide concentration being from about 2 to about 12 percent by weight of the film.

3. Coated seed according to claim 1 wherein the pesticide is O,O-diethyl S-[2-(ethylthio)ethyl]phosphorodithioate, or 1,4-dichloro 2,5-dimethoxybenzene, or a mixture of -N-[(trichloromethyl)thio]-4-cyclohexane-1,2-dicarboximide with 2,2 bis (p-methoxyphenyl)-1,1,1 trichloroethane.

4. Coated seed according to claim 1 wherein said halogenated vinyl resin is selected from the group consisting of vinyl chloride-vinylidene copolymers, vinyl chloride-butadiene-styrene terpolymers, vinyl chloride-butadiene-acrylonitrile terpolymers, polyvinyl acrylates, and mixtures thereof.

5. A cotton seed comprising a first coating of natural or synthetic resin adhesively adhering cotton fibers to each other and to the seed, a second coating completely contacting said first coating, said second coating comprising a polymeric pesticide film wherein the pesticide is systemic pesticide uniformly incorporated in said film in an effective amount for release at a predetermined rate conforming to the growth rate of the cotton plant.

6. A process for treating cotton seed, which is of a plant having a rate of growth which process comprises:
   A. providing a uniform admixture of a film-forming halogenated vinyl resin emulsion with an effective concentration of systemic pesticide, which satisfies U.S.D.A. regulations for the seed, as a seed coating formulation;
   B. coating said seed with the pesticide resin seed coating formulation; and
   C. drying the resulting coating to form on the seed a uniform polymeric film having said pesticide uniformly distributed there through, the film being constituted to release the pesticide at a rate which conforms to the growth rate of the plant.

7. A process according to claim 6 wherein the vinyl resin is a vinyl halide polymer selected from the group consisting of homopolymer, copolymer, and terpolymer.

8. A process according to claim 6 wherein the pesticide is an organophosphorus insecticide.

9. A process according to claim 8 wherein from about 2 percent to about 12 weight percent of pesticide is in said polymeric film.

10. A process according to claim 6 wherein said seed is delinted cotton seed.

11. A process according to claim 6 wherein the pesticide is O,O-diethyl S-[2-(ethylthio)ethyl]phosphorodithioate, or 1,4-dichloro 2,5-dimethoxybenzene, or a mixture of N-[(trichloromethyl)thio]-4-cyclohexane-1,2-dicarboximide with 2, 2 bis(p-methoxyphenyl)-1,1,1 trichloroethane.

12. A process according to claim 6 wherein said halogenated vinyl resin is selected from the group consisting of vinyl chloride-vinylidene copolymers, vinyl chloride-butadiene-styrene terpolymers, vinyl chloride-butadiene-acrylonitrile terpolymers, polyvinyl acrylates, and mixtures thereof.

* * * * *

UNITED STATES PATENT OFFICE
CERTIFICATE OF CORRECTION

PATENT NO. : 3,911,183
DATED : October 7, 1975
INVENTOR(S) : Thomas M. Hinkes

It is certified that error appears in the above-identified patent and that said Letters Patent are hereby corrected as shown below:

Column 8, line 66 (Claim 2), change "whereins aid" to -- wherein said -- .

Column 9, line 1 (Claim 2, after "is" insert -- an -- .

Column 9, line 7 (Claim 3), cancel "hyphen (-)" before "N".

Column 9, line 8 (Claim 3), change "cyclohexane" to -- cyclohexene -- .

Column 9, line 9 (Claim 3), insert a hyphen (-) before "trichloroethane".

Column 10, line 5 (Claim 6), change "there through" to -- therethrough -- .

Column 10, line 22 (Claim 11), change "cyclohexane" to -- cyclohexene -- .

Column 10, line 24 (Claim 11), insert a hyphen (-) before "trichloroethane".

Signed and Sealed this sixteenth Day of March 1976

[SEAL]

Attest:

RUTH C. MASON
Attesting Officer

C. MARSHALL DANN
Commissioner of Patents and Trademarks